(12) United States Patent
Hicks et al.

(10) Patent No.: US 11,132,286 B1
(45) Date of Patent: Sep. 28, 2021

(54) DYNAMIC REORDERING OF TEST CASE EXECUTION

(71) Applicant: INTERNATIONAL BUSINESS MACHINES CORPORATION, Armonk, NY (US)

(72) Inventors: Andrew C. M. Hicks, Wappingers Falls, NY (US); Deborah A. Furman, Staatsburg, NY (US); Ryan Thomas Rawlins, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/850,564

(22) Filed: Apr. 16, 2020

(51) Int. Cl.
*G06F 11/36* (2006.01)

(52) U.S. Cl.
CPC ...... *G06F 11/3684* (2013.01); *G06F 11/3676* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | |
|---|---|---|
| 7,178,063 B1 | 2/2007 | Smith |
| 8,543,966 B2 | 9/2013 | Bickford |
| 9,037,915 B2 | 5/2015 | D'Alterio |
| 9,342,424 B2 | 5/2016 | Fan |
| 10,026,053 B1 | 7/2018 | Narayan |
| 10,380,004 B2* | 8/2019 | Liemandt ............ G06F 11/3672 |
| 2004/0133881 A1* | 7/2004 | Chamberlain ...... G06F 11/3684 717/125 |
| 2008/0215921 A1 | 9/2008 | Branca |
| 2009/0265694 A1 | 10/2009 | Bakowski |
| 2011/0078651 A1 | 3/2011 | Ovadia |
| 2012/0260132 A1* | 10/2012 | Blue ................. G06F 11/3676 714/38.1 |
| 2013/0103983 A1* | 4/2013 | Tzoref-Brill ........ G06F 11/3676 714/26 |

(Continued)

OTHER PUBLICATIONS

Fang et al., "Similarity-Based Test Case Prioritization Using Ordered Sequences of Program Entities," Software Qual J 22, pp. 335-361 (2014). https://doi.org/10.1007/s11219-013-9224-0. Published Nov. 21, 2014.

(Continued)

*Primary Examiner* — Philip Wang
(74) *Attorney, Agent, or Firm* — Cantor Colburn LLP; Teddi Maranzano

(57) ABSTRACT

A computer-implemented method for testing a system under test (SUT) in an active environment includes generating multiple test cases. The method further includes executing, by the testing system, a first set of test cases from those generated, and determining a test case that failed. Further a code path that is exercised by the test case is detected, the code path having a defect. The method further includes identifying, by the testing system, a second set of test cases from the test cases that are generated, wherein each test case from the second set of test cases has not been executed and exercises the code path that is identified. The method further includes reordering, by the testing system, at runtime, the test cases to omit execution of the second set of test cases.

20 Claims, 5 Drawing Sheets

(56) References Cited

U.S. PATENT DOCUMENTS

| | | | |
|---|---|---|---|
| 2013/0159774 A1* | 6/2013 | Budnik | G06F 11/3688 |
| | | | 714/33 |
| 2013/0311976 A1* | 11/2013 | Bhat | G06F 11/3676 |
| | | | 717/130 |
| 2014/0325480 A1 | 10/2014 | Bhagavatula | |
| 2016/0034375 A1* | 2/2016 | Sinha | G06F 8/70 |
| | | | 717/131 |
| 2017/0116114 A1* | 4/2017 | Tosar | G06F 11/3684 |
| 2019/0196950 A1* | 6/2019 | Ranganathan | G06F 15/76 |
| 2019/0294535 A1 | 9/2019 | Allen | |

OTHER PUBLICATIONS

Kim et al., "A History-Based Test Prioritization Technique for Regression Testing in Resource Constrained Environments," Proceedings of the 24th International Conference on Software Engineering (ICSE) 2002, pp. 119-129. doi: 10.1109/ICSE.2002.1007961.

Roongruangsuwan et al., "A Test Case Prioritization Method with Practial Weight Factors," Journal of Software Engineering 4 (3): pp. 193-214, 2010.

Saff et al., "Reducing wasted development time via continuous testing," Proceedings of the 14th International Symposium on Software Reliability Engineering (ISSRE), Nov. 17-21, 2003. 12 pages.

\* cited by examiner

| Operation # | Test 1 (202a) | Test 2 (202b) | Test 3 (202c) | Test 4 (202d) | Test 5 (202e)... |
|---|---|---|---|---|---|
| 1 | A | B | A | A | C |
| 2 | B | C | C | D | B |
| 3 | C | D | B | E | D |
| 4 | D | A | D | | |

DYNAMIC REORDERING OF TEST CASE EXECUTION

BACKGROUND

The present invention generally relates to product testing, and more particularly, to reordering test cases from a regression bucket using a return code feedback loop.

Computerized devices control almost every aspect of our life—from writing documents to controlling traffic lights. However, computerized devices are often error-prone, and thus require a testing phase in which the errors should be discovered. The testing phase is considered one of the most difficult tasks in designing a computerized device. The cost of not discovering an error may be enormous, as the consequences of the error may be disastrous. Coverage tools for checking software provide a measure of how well the software being evaluated has been exercised during testing and thereby give a level of assurance that the software is of high quality.

Typically, users of system development, testing and production environments (e.g., software developers, hardware developers, etc.) may use program logs, crash reports, and debuggers to investigate the quality of a product such as a software program, a hardware component, etc. Testing a product during a development cycle may be challenging. The larger the product, the more source code and components to be tested, and the more challenging the testing may become. A failure may occur during testing due to any number of things such as source code changes, hardware design change, requirement changes, and environment changes, among other factors.

SUMMARY

According to one or more embodiments of the present invention, a computer-implemented method for testing a system under test (SUT) in an active environment includes generating, by a testing system, multiple test cases for testing the SUT, the multiple test cases generated based on a coverage model of the SUT, wherein the coverage model includes multiple attributes. The method further includes executing, by the testing system, a first set of test cases from the multiple test cases. The method further includes determining, by the testing system, from the first set of test cases, a test case that failed. The method further includes detecting, by the testing system, a code path that is exercised by the test case, wherein the code path has a defect that causes the test case to fail. The method further includes identifying, by the testing system, a second set of test cases from the multiple test cases, wherein each test case from the second set of test cases has not been executed and exercises the code path that is identified. The method further includes reordering, by the testing system, at runtime, the multiple test cases to omit execution of the second set of test cases.

According to one or more embodiments of the present invention, a system includes a testing system that performs a method to test a system under test (SUT) that is being executed in an active environment. The method includes generating multiple test cases for testing the SUT, the multiple test cases generated based on a coverage model of the SUT, wherein the coverage model includes multiple attributes. The method further includes executing a first set of test cases from the multiple test cases. The method further includes determining from the first set of test cases, a test case that failed. The method further includes detecting a code path that is exercised by the test case, wherein the code path has a defect that causes the test case to fail. The method further includes identifying a second set of test cases from the multiple test cases, wherein each test case from the second set of test cases has not been executed and exercises the code path that is identified. The method further includes reordering at runtime, the multiple test cases to omit execution of the second set of test cases.

According to one or more embodiments of the present invention, a computer program product includes a computer-readable storage media having computer-executable instructions stored thereupon, which, when executed by one or more processing units cause the processing units to perform for testing a system under test (SUT) in an active environment. The method includes generating multiple test cases for testing the SUT; the multiple test cases generated based on a coverage model of the SUT, wherein the coverage model includes multiple attributes. The method further includes executing a first set of test cases from the test cases. The method further includes determining from the first set of test cases, a test case that failed. The method further includes detecting a code path that is exercised by the test case, wherein the code path has a defect that causes the test case to fail. The method further includes identifying a second set of test cases from the multiple test cases, wherein each test case from the second set of test cases has not been executed and exercises the code path that is identified. The method further includes reordering at runtime, the multiple test cases to omit execution of the second set of test cases.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts example code paths during the execution of a test run according to one or more embodiments of the present invention;

Figure 1:
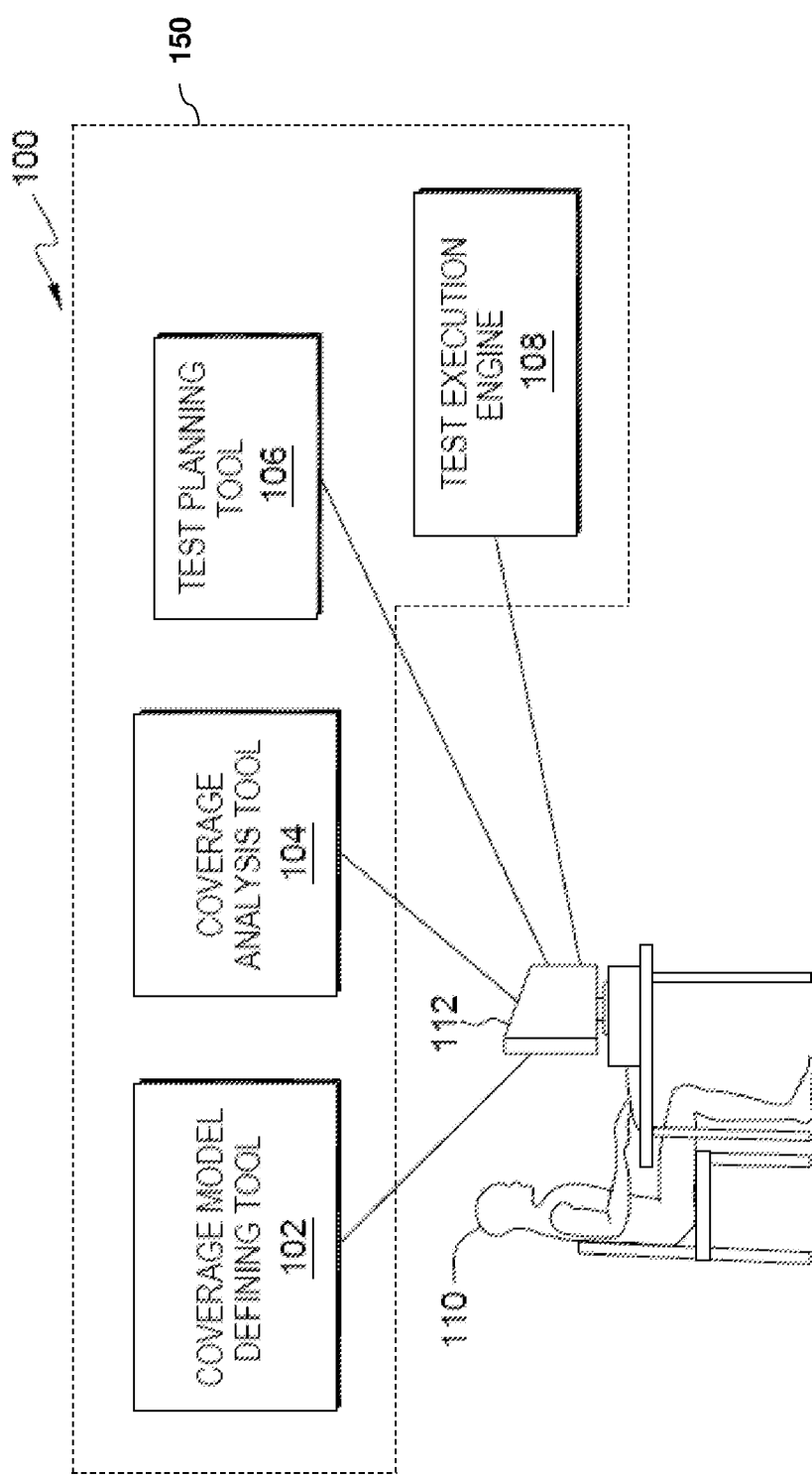
FIG. 1 shows a schematic illustration of a computerized environment in accordance with one or more embodiments of the present invention.

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describe having a communications path between two elements and does not imply a direct connection between the elements with no intervening elements/connections between them. All of these variations are considered a part of the specification.

DETAILED DESCRIPTION

Example embodiments of the present invention relate to, among other things, devices, systems, methods, computer-readable media, techniques, and methodologies for performing fault detection and localization using Combinatorial Test Design (CTD) techniques, generating a regression bucket of test cases that expose the detected fault, and dynamic selection of an order of execution of test cases within the regression bucket. In example embodiments, the detected and localized fault occurs in a System Under Test (SUT). The SUT may be a hardware system, a software system, or a combination thereof.

The SUT can be tested using test cases in a regression bucket. When a test case in the regression bucket fails, a technical challenge is to prevent or reorder the execution of test cases in the regression bucket that are similar to the test case that failed. Executing test cases that detect the same failure/error in the SUT causes inefficiencies in the usage of computing resources and time, which can be used for uncovering other defects in the SUT. Embodiments of the present invention address such technical challenges by reordering the test cases in the regression bucket dynamically. The reordering facilitates bypassing one or more test cases that are determined to be similar to a failed test case.

According to one or more embodiments of the present invention, CTD is performed with respect to an interaction requirement, such as a pair-wise interaction, n-tuple interaction, or any other. The test plan may provide for sufficient coverage tasks that assure that the interaction requirement is fulfilled. In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes. In other embodiments of the present invention, the coverage model can include one from a number of types of coverage known in the art, such as statement coverage, line coverage, condition coverage, path coverage, method coverage, and the like. The type of coverage does not affect identifying soft failures.

Further, with respect to test planning, a test-space may define potential test cases that may be executed on the SUT. A test can be associated with exactly one potential test, as opposed to coverage tasks. In some exemplary embodiments of the present invention, several different test cases may hold the same potential test.

In some exemplary embodiments of the present invention, the motivation for the approach of CTD is that most bugs depend on the interaction between a small number of functional attributes. CTD algorithms may also deal with scalability issues. The CTD algorithms may assume that the combinations space is too large to be represented explicitly, and the CTD algorithms use various techniques to try to generate an optimized test plan without explicitly enumerating all possible combinations. Examples of such algorithms may be a reduction to the orthogonal arrays or covering array problems. Those techniques are limited in the type of restrictions they allow on the value combinations, or in the type of requested interaction level, and still hit scalability issues as the number of model variables increases.

Despite these reduction efforts, once the SUT has been implemented, new features are typically requested and added as users exercise the functionality of the system. New test cases are created as new features are added. Sets of test cases are, therefore, maintained for the SUT to ensure that previous functionality still works, that new functionality works, and that the new functionality does not adversely affect the old functionality. These test case sets are termed regression test cases, and the activity of testing the SUT to ensure conformance with legacy requirements is typically termed regression testing.

Generally, at least some of the regression test case sets are created and maintained manually over the life of the SUT. They are manually selected based on the number of test cases that can be run in an allotted amount of time, test cases that exercise the most important features of the SUT, and test cases that have historically exposed the greatest number of problems in the SUT when introducing new features, or other such reasons. A drawback of conventional regression testing is that some of the additional test cases repeat test actions that are covered by other test cases in the regression test case set. This is the penalty associated with the incremental addition of test cases. For a large, complex project, using the manual iterative method of adding test cases to the regression test case set can result in a large number of duplicate test actions. Such technical challenges are also addressed by the technical solutions facilitated by embodiments of the present invention.

Referring now to FIG. 1, showing a schematic illustration of a computerized environment in accordance with embodiments of the present invention. A computerized environment 100 may include one or more computerized tools. It should be noted that the depiction is one possible example of a block diagram and that some components may not be depicted for clarity. The computerized tool includes a testing system 150 that is used to test other systems, such as the SUT.

In one or more embodiments of the present invention, an operator 110, such as a developer, a QA staff member, a tester, a designer, a verification engineer, or the like, may interact with the testing system 150. The operator 110 may utilize a Man-Machine Interface (MMI) 112, such as a terminal, a display, a keyboard, an input device, or the like.

In one or more embodiments of the present invention, the testing system 150 includes a coverage model defining tool 102, a coverage analysis tool 104, a test planning tool 106, and a test execution engine 108, among other components. In some exemplary embodiments of the present invention, a coverage model defining tool 102 may be utilized to define the test coverage model, such as a functional coverage model, or the like. In some exemplary embodiments of the present invention, the operator 110 may define the attributes that are to be tested, for example, the functional attributes in case a functional coverage is being tested. In some exemplary embodiments of the present invention, a similar tool may be utilized to define a test-space. In some exemplary embodiments, the coverage model may be adapted to be utilized as a test model.

In some exemplary embodiments of the present invention, a test execution engine 108 may be utilized to test the SUT. It will be noted that the SUT may be hardware, firmware, software, a combination thereof, or any other type of computerized device. The test execution engine 108 may be a simulation-based verification tool, a test-generation platform, or the like. The test execution engine 108 may be operatively coupled to a test planning tool 106 and configured to perform testing in accordance with the test plan. In some exemplary embodiments, the test planning tool 106 may provide the test cases for the test execution engine 108 to perform. It will be noted that dynamic verification is a broader concept than testing the SUT, and it further includes test planning, coverage analysis, and the like. The test execution engine 108 provides only one aspect of the entire scope of operations that may be performed during dynamic verification and should not be used to construe the term "dynamic verification" narrowly.

In some exemplary embodiments of the present invention, a coverage analysis tool 104 is configured to measure coverage of the test space for the SUT based on the dynamic verification performed by the test execution engine 108. For example, the coverage analysis tool 104 can be a functional coverage analysis tool. The coverage analysis tool 104 provides a coverage measurement, such as a portion of the coverage test-space or of the defined test plan, indicative of coverage tasks that were covered during dynamic verification performed by the test execution engine 108. The operator 110 may review the coverage measurement and/or the list of covered tasks.

In some exemplary embodiments of the present invention, a test planning tool 106 may define a test plan to be covered. In some exemplary embodiments of the present invention, the test plan may be a set of coverage tasks to be covered. In some exemplary embodiments of the present invention, the test planning tool 106 may provide test cases that are likely to cover the test plan, such as based on a test benchmark stored in a datastore, which includes test cases that are known/estimated to cover specific aspects of the SUT. As another example, the test planning tool 106 is configured to generate test cases so as to cover coverage tasks. The operator 110 may review the test plan, the selected test, or the like. In some exemplary embodiments of the present invention, the operator 110 may provide parameters for the test planning tool 106 to use in determining the objective of the test plan, such as a desired interaction level.

While the depiction in FIG. 1 has been described with specific components including the coverage model defining tool 102, coverage analysis tool 104, test planning tool 106 and the test execution engine 108, embodiments of the present invention are not limited to these components or system configurations and can be implemented with other system configuration employing fewer or additional components.

Figure 2:
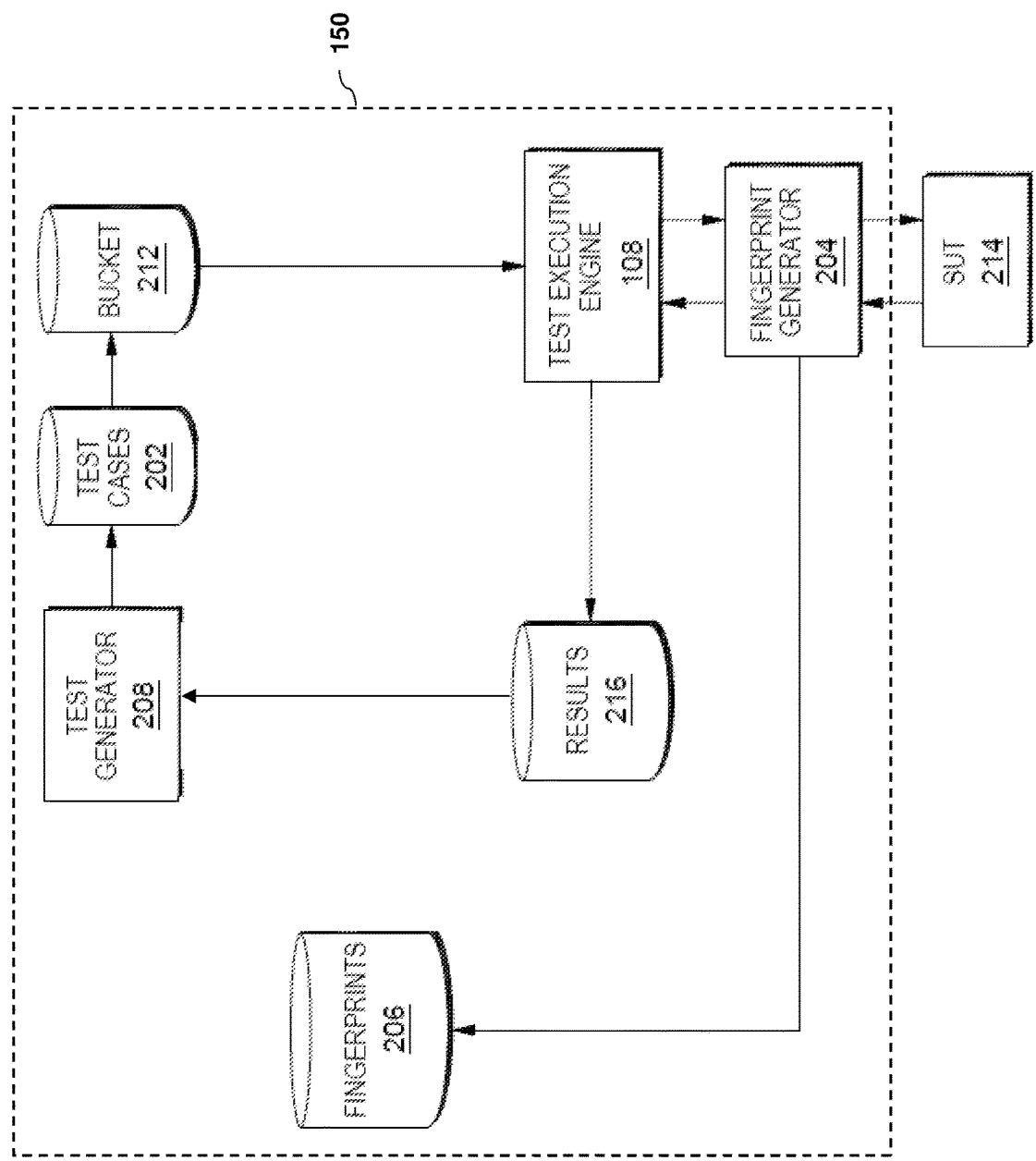
FIG. 2 is a block diagram representing modules providing a testing infrastructure according to an embodiment of the invention.

FIG. 2 is a block diagram representing modules providing a testing infrastructure according to an embodiment of the invention. More specifically, the infrastructure includes a test generator 208. The test generator 208 accesses a test infrastructure, such as a repository of test cases 202, which stores suites of test cases available to verify the correctness of the SUT 214. Each test case specifies an input to be applied to the SUT 214 and the expected response that should be returned in response to this input (to indicate its correct operation). Typically, the test cases are organized into sets (test suites), for example, each test suite for a different component of the SUT 214.

The test generator 208 creates an execution bucket for each run of the test on the SUT 214. The bucket specifies the operations to be performed for running the desired test cases in a machine-readable language (such as XML-based). Particularly, in the case of a complete test, all the available test cases are executed on each component of the SUT 214; conversely, in the case of a regression test, the execution is limited to a subset of selected test cases. The bucket so obtained can be saved into a file.

A test execution engine 108 controls the execution of the bucket read from the file. For each test case of the bucket, this involves the application of the corresponding input to the SUT 214. In response thereto, the SUT 214 returns a corresponding output to the test execution engine 108. The test execution engine 108 determines the result of the test case by comparing its output with the corresponding expected response (extracted from the file, for example). The result of the test case (i.e., positive when the two values match and negative otherwise) is saved into a log. For example, this may be achieved by means of a standard Test Tracking Tool (TTT). The results of the (current) run of the test are available in the log for their analysis.

For a large, complex SUT 214, the test repository of test cases 202 can contain a large number of duplicate test actions/test cases. In accordance with certain embodiments of the present invention, one technique developed to address these challenges incorporates the use of a fingerprint repository 206 with a store of information including a set of fingerprints that correspond to a plurality of regression test cases stored in the test repository of test cases 202. In one embodiment, the fingerprints are generated by a fingerprint generator 204. For instance, the fingerprint repository 206 can include fingerprints of most, if not all, of the test cases stored in the test repository of test cases 202 and a reference to where copies of the test are located throughout the test infrastructure, similar to an index in a book. Each fingerprint uniquely identifies a specific code path covered by a corresponding test case.

In one or more embodiments of the present invention, the fingerprint generator 204 may generate fingerprints for each respective test that has been run on the SUT 214. The fingerprint generator 204 may retrieve the preexisting regression test cases from one or more datastores, such as test repository of test cases 202. In one or more embodiments of the present invention, these preexisting regression test cases may have been executed on source code, which may also be retrieved from the test repository of test cases 202. In one or more embodiments of the present invention, inputs to the source code to be tested may be modeled as a collection of attribute-value pairs. As such, in certain example embodiments, each regression test case may be a test case to test the operation of the source code of the SUT 214 with respect to a particular combination of attribute values. In one or more embodiments of the present invention, the fingerprint generator 204 may generate fingerprints for each executed regression test based at least in part on the code path traversed by the source code covered by the corresponding test case.

According to embodiments of the present invention, processing of the results 216 of the regression test cases generated by the test generator 208 and executed by the test execution engine 108 may include determination of a code path traversed during the execution of each generated regression test and generation of a fingerprint for each executed regression test based at least in part on the code path. In some embodiments of the present invention, these steps may be performed by the fingerprint generator 204.

In one or more embodiments of the present invention, a redundancy analyzer (not shown) can compare the fingerprints corresponding to all test cases generated by the test generator 208 to a plurality of fingerprints stored in the fingerprint repository 206 to determine the regression test cases generated by the test generator 208 that have matching fingerprints with one or more fingerprints stored in the fingerprint repository 206.

The program modules depicted in FIG. 1, FIG. 2, and any other figure herein, may be implemented in any combination of hardware, software, and/or firmware. In certain example embodiments of the present invention, one or more of these program modules may be implemented, at least in part, as software and/or firmware modules that include computer-executable instructions that, when executed by a processing circuit cause one or more operations to be performed. A system or device described herein as being configured to implement example embodiments of the present invention may include one or more processing circuits, each of which may include one or more processing units or nodes. Computer-executable instructions may include computer-executable program code that, when executed by a processing unit may cause input data contained in or referenced by the computer-executable program code to be accessed and processed to yield output data.

The test generator 208 may generate one or more test cases (e.g., a set of regression test cases) to run on the SUT 214. In one embodiment, the test generator 208 may utilize CTD to determine a set of test cases to be executed. In one embodiment, the test generator 208 may be given a description of a test space in the form of variables, their respective values, and possibly restrictions on the combinations of the values. In one exemplary embodiment, the test generator 208 may select a subset of the possible test cases that ensures coverage of all valid combinations of every two attributes (or every three, or four, etc.). Many tools and algorithms exist for CTD, and the embodiments disclosed herein may utilize any of one or more of them.

In one or more embodiments of the present invention, the test generation may be performed by selecting a subset of the test cases that would maintain 100% n-wise coverage with respect to the tested test space, and therefore maintaining the n-wise coverage metric with respect to the valid test space. In some exemplary embodiments of the present invention, the coverage analysis tool 104 may be operative to determine a subset of the possible combinations of values. The subset of the possible combinations of values is with respect to the covered test space defined by the coverage model determined by the coverage model defining tool 102. The most common criterion for test selection is code coverage, i.e., select a subset of the test cases that cover code that has recently changed, for example. As noted earlier, the coverage model can be a functional code coverage model.

According to one or more embodiments of the present invention after the test execution engine 108 executes the generated test cases, the fingerprint generator 204 generates fingerprints corresponding to the executed test cases. For example, each fingerprint uniquely identifies the code path traversed during the execution of a corresponding regression test. In some exemplary embodiments of the present invention, the fingerprint generation algorithm employed by the fingerprint generator 204 generates a fingerprint that identifies not only the breakpoints encountered during traversal of a code path and the number of times each such breakpoint is encountered but also the order in which the encounters occur. Thus, if the execution of two different regression test cases results in code paths that encounter the same breakpoints the same number of times but in different orders, the respective fingerprint generated for each regression test will uniquely identify the particular order in which breakpoint encounters occur for that regression test.

As a non-limiting example, if the fingerprint generator 204 employs a string-based algorithm and generates the fingerprint <ABABCDCDE> for a corresponding regression test. It should be noted, each element of the string <ABABCDCDE> identifies a corresponding breakpoint that is encountered; the number of times that the same element appears in the string indicates the number of times the corresponding breakpoint is encountered, and the ordering of the elements in the string indicates the order in which the breakpoints are encountered. It should be noted that in other embodiments of the invention, the fingerprint is represented using other formats, such as a hash key, or any other format.

FIG. 3 depicts example code paths encountered by different test cases according to one or more embodiments of the present invention. Each column in the table depicted in FIG. 3 is a code path that can be encountered by respective test cases 202. The code path is depicted as a sequence of encounter identifiers. Encounters can include operations, breakpoints, functions, memory locations, line of code, code snippet, or any other identifier in the source code of the SUT 214, or a combination thereof, such that a developer can identify a particular section/portion of the source code of the SUT 214 based on the encounter identifier. For example, "A" can be the name of a function that is called during the execution of the SUT 214. Alternatively, or in addition, "A" can be a breakpoint in the source code of the SUT 214. Alternatively, or in addition, "A" can be a line number in the source code of the SUT 214.

As shown in FIG. 3, a first test case 202a causes the SUT 214 to execute according to the code path A-B-C-D (410), where A, B, C, and D, are encounter identifiers. A second test case 202b exercises a code path (410) B-C-D-A, a third test case 202c exercises a code path (410) A-C-B-D, a fourth test case 202d exercises code path (410) A-D-E, and a fifth test case 202e exercises a code path (410) C-B-D. As can be seen, the same encounters can be exercised in a different order by different test cases. It is understood that the encounter names, number of encounters, are exemplary and that in one or more embodiments of the present invention, there can be different encounter names and different number of encounters from those in the examples used herein.

In example embodiments of the present invention, while executing multiple test cases within a regression bucket against the SUT 214, test cases that are created to verify similar parameters and to exercise a particular execution path of the SUT 214, for example, a code path, may often fail at different points in time. However, a defect that causes a test case to fail may be widespread. For example, such a defect may cause several or even all test cases in the regression bucket to fail. That is, in other words, several test cases from the regression bucket may fail for the same reason. For example, a storage outage may cause storage account creations to fail, which can result in similar failure logs, which can be grouped into one large bucket of failures.

In such a scenario, the execution time of all the test cases results in the detection of a single defect. It should be noted that in larger SUT 214, such as enterprise systems, such execution times can be in the order of multiple days, and even weeks. Hence, spending the time and other resources (e.g., computing resources, electricity, personnel, etc.) for executing the test cases in the regression bucket to only detect a single defect is inefficient, and one of the technical challenges faced by the testing system 150. One or more embodiments of the present invention address such technical challenges and improve the efficiency of the testing system 150. Early detection is useful for fast mitigation and to save engineering investigation time.

To address such technical challenges, in one or more embodiments of the present invention, the order of execution of the test cases is revised at runtime to optimize the time of execution. In one or more embodiments of the present invention, by optimizing the order in which test cases are run, regression bucket execution times can be drastically reduced to yield faster completion times. That is, in one or more embodiments of the present invention, particular combinations of test cases within the regression bucket may be executed first to exercise code paths or flows in the SUT 214 that are different from those that have already been identified to be defective. In this manner, it can be ensured that regression testing is optimized so as to be performed faster and/or with increased accuracy.

For example, consider a first test case that causes the SUT 214 to execute operations A-B-C-D and that the first test case fails. Using inverse CTD, it is then determined that the flow of operations A-B is the failing flow, i.e., the cause of the first test case to fail. In this case, embodiments of the present invention dynamically reorder any remaining test cases and generation of additional test cases in the regression bucket such that the other and/or new test cases that would cause the SUT 214 to execute the flow A-B are assigned a lower priority. Accordingly, more test cases are generated and executed to exercise the flows B-C and C-D on the SUT 214. Further, test cases with a B-C or C-D as the starting state are given higher priority. In one or more embodiments of the present invention, such dynamic weighting forces execution of those test cases that cause the A-B flow on the SUT 214 to run last and the execution of the test cases that do not have that flow to run first. This facilitates the testing system 150 to flush out different errors in the SUT 214 quicker by avoiding the test cases that are known to fail and that identify a known defect.

One or more embodiments of the present invention relate to, among other things, devices, systems, methods, computer-readable media, techniques, and methodologies for testing a product for detecting defects in the product. One or more embodiments of the present invention improve such testing techniques. Example embodiments of the present invention include various technical features that yield technical effects that provide various improvements to computer technology. For instance, example embodiments of the present invention include the technical feature of generating a regression bucket of test cases that test cases every possible combination of attribute values that includes the particular subset of attribute values causing the n-wise fault. Such a regression bucket includes only test cases that would all fail prior to correction of the fault, and that would all pass after correction of the fault. The automated generation of a regression bucket of failing test cases in accordance with example embodiments of the invention provides an improvement to computer technology by providing dynamic reordering of test cases to exercise different parts of the SUT 214 more efficiently by skipping test cases that exercise a code path that is known to be defective.

Figure 4:
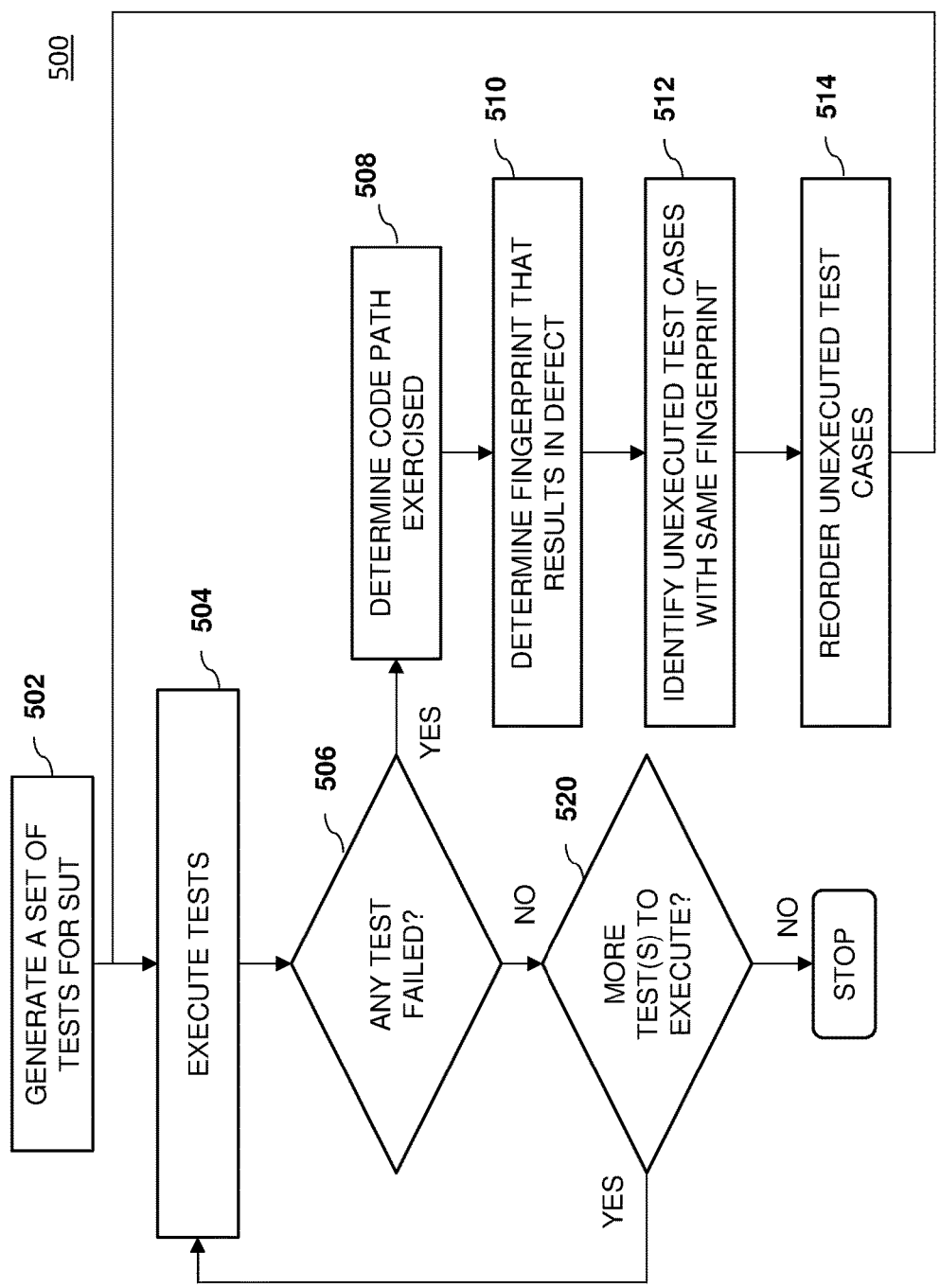
FIG. 4 depicts a flowchart of a method for reordering test cases at runtime according to one or more embodiments of the present invention.

FIG. 4 depicts a flowchart of a method to dynamically reorder test cases to avoid executing test cases that exercise code paths that are known to be defective according to one or more embodiments of the present invention. The depicted method 500 includes generating test cases 202 for the SUT 214, at block 502. The test cases 202 can be attribute-value pairwise test cases. The pairwise test cases can be generated using CTD in one or more embodiments of the present invention. Any other technique can be used for generating pairwise test cases. In one or more embodiments of the present invention, generating the test cases includes selecting a reduced set of the pairwise test cases to provide maximum test coverage for the SUT 214.

The method 500 further includes executing a subset of test cases 202, at block 504. The subset can be a single test case 202 in one or more embodiments of the present invention. Alternatively, in one or more embodiments of the present invention, the subset can include a predetermined number of test cases. The method 500 further includes determining if any of the test cases from the subset failed, at block 506. If none of the executed test cases failed, the method 500 continues to execute the next subset of test cases 202. Although not explicitly shown in the flowchart, the method 500 stops when all the test cases 202 are executed.

For a test case that failed, the method 500 includes determining the code path(s) 410 that was exercised by that failing test case, at block 508. The code path 410, in one or more embodiments of the present invention, is determined by the fingerprint generator 204 and can be stored in the fingerprint repository 206.

The method 500 further includes determining a fingerprint, in this case, an order of encounters, in the code path 410 that results in the defect, at block 510. The order of the encounters causing the defect is determined using inverse CTD in one or more embodiments of the present invention. Other known techniques can also be used to determine the encounter order that results in the defect. Further, the method 500 includes identifying unexecuted test cases from the set of test cases 202 being executed that exercise the same encounter order, at block 512. Alternatively, test cases 202 that do not have that fingerprint are identified. The unexecuted test cases are subsequently reordered based on the identified test cases, at block 514. In one or more embodiments of the present invention, the test cases 202 are reordered such that the test cases 202 that have the same fingerprint as the failing test case are skipped, that is, not executed. Alternatively, the reordering is performed so that the unexecuted test cases with the same fingerprint are executed last, i.e., after other test cases 202, those with a fingerprint different from the failing test case are executed. In yet other embodiments of the present invention, the reordering includes generating new test cases to replace the unexecuted test cases such that during the generation of the replacement test cases, the test generator gives lesser priority to test cases that exercise the code path 410 that is known to be defective. Further, the reordered test cases 202 are executed on the SUT 214. The reordering and executing continues in an iterative manner.

Alternatively, if none of the test cases fail (506), and if there are no more test cases left to execute, at block 520, the method 500 ends; otherwise, the execution of the test cases continues in a loop, at block 520.

An example run of the method 500 is now described. Consider an initial order of test cases 202, as shown in table 1. The corresponding code paths are depicted by a sequence of encounter identifiers—A, B, C, D, and E.

TABLE 1

Initial order of test programs in the regression bucket:
Test 1: ABCD - fails
Test 2: ACBD - fails
Test 3: BCDA -succeeds
Test 4: ABDC - fails
Test 5: ADE
Test 6: CBD
Test 7: BCD
Test 8: BDAC
Test 9: ACDB
Test 10: CDE In the above example scenario, after Test 4 completes, analysis indicates that the failing fingerprint is A-B or A-x-B where A runs before B. At this point, in one or more embodiments of the present invention, the testing system 150 reorders the test cases such that test cases with A-B or A-x-B are put at the end of the execution run. Alternatively, in one or more embodiments of the present invention, the test cases with A-x-B are temporarily omitted from the run until the problem in the SUT 214 is corrected. In yet other embodiments of the present invention, the testing system 150 reweights the ordering of A-B or A-x-B and regenerates the test cases such that it favors the B-C, C-D ordering over the A-B ordering in the new test cases that are generated.

Table 2 depicts the case where test cases with A-x-B (which includes A-B) are reordered to the end of the execution run.

TABLE 2

Test 3: BCDA -succeeds
Test 10: CDE
Test 7: BCD
Test 6: CBD ** this test has C-x-D, and so runs first
Test 5: ADE
Test 8: BDAC
-----------------> the following test cases 9,1,2,4 could
either be executed or omitted
Test 9: ACDB - projected to fail
Test 1: ABCD - fails
Test 2: ACBD - fails
Test 4: ABDC - fails Table 3 depicts the case where replacement test cases are generated with A-x-B given lower priority so that test cases with that code path are not generated, i.e., omitted.

TABLE 3

Test 1: CDBE
Test 2: ACD
Test 3: BCDA
Test 10: CDE
Test 7: BCD
Test 6: CBD ** this test has C-x-D so has a higher priority
Test 4: CBA
Test 5: ADE
Test 8: BDAC
Test 9: ADC Embodiments of the present invention facilitate reordering the test cases being executed directly to expose more coverage areas in a test run and avoiding inefficiencies due to exercising the same defective code path repeatedly. Further, embodiments of the present invention facilitate analysis of the test runs in real-time resulting in optimization of the order of test cases to increase the amount of coverage and exposure of the SUT 214. Embodiments of the present invention achieve the optimization and reordering of the test cases using a feedback loop using one or more failed test cases. Embodiments of the present invention accordingly improve the operation of the testing system by preventing hang-ups in the test execution engine 108.

Figure 5:
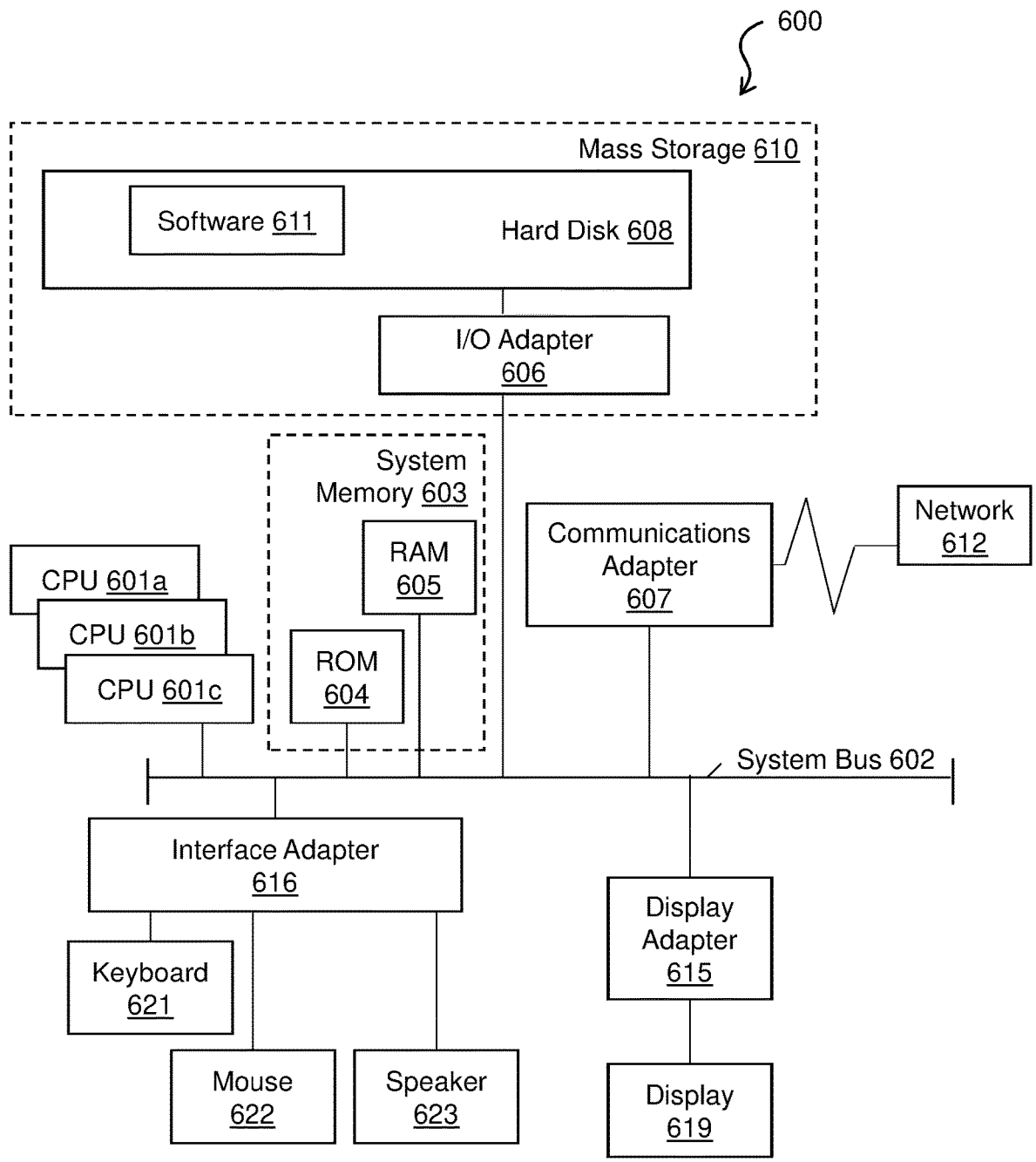
FIG. 5 depicts a computer system that may be used in one or more embodiments of the present invention.

Turning now to FIG. 5, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 5, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 5.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 5 is not intended to indicate that the computer system 600 is to include all of the components shown in FIG. 5. Rather, the computer system 600 can include any appropriate fewer or additional components not illustrated in FIG. 5 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for testing a system under test (SUT) in an active environment, the computer-implemented method comprising:
   generating, by a testing system, a plurality of test cases for testing the SUT, the plurality of test cases generated based on a coverage model of the SUT, wherein the coverage model comprises a plurality of attributes;
   executing, by the testing system, a first set of test cases from the plurality of test cases;
   determining, by the testing system, from the first set of test cases, a test case that failed;
   detecting, by the testing system, a code path that is exercised by the test case, wherein the code path has a defect that causes the test case to fail;
   identifying, by the testing system, a second set of test cases from the plurality of test cases, wherein each test case from the second set of test cases has not been executed and exercises the code path that is identified; and
   reordering, by the testing system, at runtime, the plurality of test cases to omit execution of the second set of test cases.

2. The computer-implemented method of claim 1, wherein each of the plurality of attributes has a set of possible values and wherein the coverage model defines possible combinations of values of the attributes as covered by the plurality of test cases.

3. The computer-implemented method of claim 2, wherein the coverage model is a functional coverage model of the SUT.

4. The computer-implemented method of claim 1, wherein the plurality of test cases is generated using combinatorial test design (CTD).

5. The computer-implemented method of claim 4, wherein the code path is detected using inverse CTD.

6. The computer-implemented method of claim 1, wherein reordering the test cases comprises:
generating a third set of test cases that excludes exercising the code path; and
replacing the second set of test cases with the third set of test cases.

7. The computer-implemented method of claim 1, wherein the code path is identified using a unique fingerprint that identifies a sequence of operations performed by the SUT during execution of the test case.

8. A system comprising:
a testing system comprising a memory device and one or more processors coupled with the memory device, the one or more processors configured to perform a method comprising:
generating a plurality of test cases for testing a system under test (SUT) that is being executed in an active environment, the plurality of test cases generated based on a coverage model of the SUT, wherein the coverage model comprises a plurality of attributes;
executing a first set of test cases from the plurality of test cases;
determining from the first set of test cases, a test case that failed;
detecting a code path that is exercised by the test case, wherein the code path has a defect that causes the test case to fail;
identifying a second set of test cases from the plurality of test cases, wherein each test case from the second set of test cases has not been executed and exercises the code path that is identified; and
reordering at runtime, the plurality of test cases to omit execution of the second set of test cases.

9. The system of claim 8, wherein each of the plurality of attributes has a set of possible values and wherein the coverage model defines possible combinations of values of the attributes as covered by the plurality of test cases.

10. The system of claim 9, wherein the coverage model is a functional coverage model of the SUT.

11. The system of claim 8, wherein the plurality of test cases is generated using combinatorial test design (CTD).

12. The system of claim 11, wherein the code path is detected using inverse CTD.

13. The system of claim 8, wherein reordering the test cases comprises:
generating a third set of test cases that excludes exercising the code path; and
replacing the second set of test cases with the third set of test cases.

14. The system of claim 8, wherein the code path is identified using a unique fingerprint that identifies a sequence of operations performed by the SUT during execution of the test case.

15. A computer program product comprising a computer-readable storage media having computer-executable instructions stored thereupon, which when executed by one or more processing units cause the processing units to perform for testing a system under test (SUT) in an active environment, the method comprising:
generating a plurality of test cases for testing the SUT, the plurality of test cases generated based on a coverage model of the SUT, wherein the coverage model comprises a plurality of attributes;
executing a first set of test cases from the plurality of test cases;
determining from the first set of test cases, a test case that failed;
detecting a code path that is exercised by the test case, wherein the code path has a defect that causes the test case to fail;
identifying a second set of test cases from the plurality of test cases, wherein each test case from the second set of test cases has not been executed and exercises the code path that is identified; and
reordering at runtime, the plurality of test cases to omit execution of the second set of test cases.

16. The computer program product of claim 15, wherein each of the plurality of attributes has a set of possible values and wherein the coverage model defines possible combinations of values of the attributes as covered by the plurality of test cases.

17. The computer program product of claim 15, wherein the plurality of test cases is generated using combinatorial test design (CTD).

18. The computer program product of claim 17, wherein the code path is detected using inverse CTD.

19. The computer program product of claim 15, wherein reordering the test cases comprises:
generating a third set of test cases that excludes exercising the code path; and
replacing the second set of test cases with the third set of test cases.

20. The computer program product of claim 15, wherein the code path is identified using a unique fingerprint that identifies a sequence of operations performed by the SUT during execution of the test case.

* * * * *